United States Patent
Christober

(10) Patent No.: US 11,646,941 B2
(45) Date of Patent: *May 9, 2023

(54) MULTI-CLUSTER CONFIGURATION CONTROLLER FOR SOFTWARE DEFINED NETWORKS

(71) Applicant: Juniper Networks, Inc., Sunnyvale, CA (US)

(72) Inventor: Ignatious Johnson Christober, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,529

(22) Filed: Mar. 31, 2022

(65) Prior Publication Data

US 2022/0224602 A1    Jul. 14, 2022

Related U.S. Application Data

(63) Continuation of application No. 16/451,452, filed on Jun. 25, 2019, now Pat. No. 11,329,882.

(Continued)

(51) Int. Cl.
  *H04L 41/0893* (2022.01)
  *H04L 41/0816* (2022.01)
  (Continued)

(52) U.S. Cl.
  CPC ...... *H04L 41/0893* (2013.01); *H04L 41/0816* (2013.01); *H04L 45/64* (2013.01); *H04L 63/0876* (2013.01)

(58) Field of Classification Search
  None
  See application file for complete search history.

(56) References Cited

U.S. PATENT DOCUMENTS 8,755,377 B2   6/2014  Nakil et al.
10,148,496 B2  12/2018 Tiwari et al.
(Continued)

FOREIGN PATENT DOCUMENTS

CN    108365979 A    8/2018
CN    108694071 A    10/2018

OTHER PUBLICATIONS

"Adding Hosts to an Existing Cluster: Installation and Configuration" available at https://docs.openshift.com/container-platform/3.5/install_config/configuring_sdn.html (last accessed Jun. 24, 2019) Aug. 8, 2016, 2 pp.

(Continued)

*Primary Examiner* — Mohamed Ibrahim
(74) *Attorney, Agent, or Firm* — Shumaker & Sieffert, P.A.

(57) ABSTRACT

This disclosure describes techniques for configuring software defined network (SDN) controllers within different cloud computing domains and, in particular, a multi-cluster controller that operates and presents, in some examples, a single interface for seamlessly controlling and configuring SDN controllers in different cloud computing domains. In one example, this disclosure describes a system that includes a plurality of clusters, each of the plurality of clusters including a plurality of configurable endpoints; a storage system; and processing circuitry having access to the storage system and capable of communicating with each of the plurality of configurable endpoints. In some examples, the processing circuitry is configured to receive a plurality of requests, each specifying a configuration operation, identify, for each of the requests, a configuration cluster and a configuration endpoint within the configuration cluster, and perform, for each of the requests, the specified configuration operation.

17 Claims, 12 Drawing Sheets

Related U.S. Application Data

(60) Provisional application No. 62/838,640, filed on Apr. 25, 2019.

(51) Int. Cl.
*H04L 45/64* (2022.01)
*H04L 9/40* (2022.01)

(56) References Cited

U.S. PATENT DOCUMENTS

| | | | |
|---|---|---|---|
| 10,200,274 | B1 | 2/2019 | Suryanarayana et al. |
| 10,567,288 | B1 | 2/2020 | Mutnuru |
| 2011/0023104 | A1* | 1/2011 | Franklin ............... H04L 41/044 709/205 |
| 2013/0329601 | A1 | 12/2013 | Yin et al. |
| 2014/0173018 | A1 | 6/2014 | Westphal et al. |
| 2016/0127886 | A1 | 5/2016 | Hu et al. |
| 2018/0139109 | A1 | 5/2018 | Zuerner |
| 2018/0219868 | A1 | 8/2018 | Nadeau et al. |
| 2018/0285166 | A1 | 10/2018 | Roy et al. |
| 2018/0287902 | A1 | 10/2018 | Chitalia et al. |
| 2018/0307522 | A1* | 10/2018 | Wu ..................... H04L 41/5067 |
| 2018/0359323 | A1 | 12/2018 | Madden |
| 2018/0367391 | A1 | 12/2018 | Harneja et al. |
| 2018/0367404 | A1 | 12/2018 | Harneja |
| 2018/0367521 | A1* | 12/2018 | Daidone ................ H04L 41/20 |
| 2019/0097890 | A1 | 3/2019 | Zhang et al. |
| 2019/0104061 | A1 | 4/2019 | Zhang et al. |
| 2019/0222511 | A1 | 7/2019 | Lokman et al. |
| 2019/0238634 | A1* | 8/2019 | Mohanta ............ H04L 43/0817 |
| 2020/0344124 | A1 | 10/2020 | Christober |

OTHER PUBLICATIONS

"Clusters" Google Cloud Platform, Cloud Dataproc, available at https://console.cloud.google.com/dataproc/enableApi?project=principal-yen-2372220&supportedpurview=project (last accessed Jun. 24, 2019), Nov. 2, 2018, 1 p.

"Configuring the SDN: Installation and Configuration" available at https://docs.openshift.com/container-platform/3.5/install_config/configuring_sdn.html (last accessed Jun. 24, 2019) Jan. 3, 2018, 3 pp.

"Create a Cluster" Cloud Dataproc, Google Cloud, available at https://cloud.google.com/dataproc/docs/guides/create-cluster (last accessed Jun. 24, 2019), Jul. 3, 2018, 2 pp.

"Get Started with Google Cloud Platform" Google Cloud Platform, available at https://console.cloud.google.com/getting-started?pli=1 (last accessed Jun. 24, 2019), Nov. 2, 2018, 1 p.

Extended Search Report from counterpart European Application No. 19199428.4, dated Mar. 25, 2020, 8 pp.

Muqaddas et al., "Inter-controller Traffic in ONOS Clusters for SDN Networks," 2016 IEEE International Conference on Communications (ICC), May 22-27, 2016, 6 pp.

Prosecution History from U.S. Appl. No. 16/451,452, dated Sep. 13, 2019 through Apr. 11, 2022, 51 pp.

Response to Extended Search Report dated Mar. 25, 2020 from counterpart European Application No. 19199428.4, filed Apr. 28, 2021, 28 pp.

First Office Action and Search Report, and translation thereof, from counterpart Chinese Application No. 201910936100.8 dated Oct. 8, 2022, 15 pp.

Communication pursuant to Article 94(3) EPC from counterpart European Application No. 19199428.4 dated Dec. 19, 2022, 4 pp.

* cited by examiner

```
contrail_test=# \d endpoint;
                    Table "public.endpoint"
         Column          |          Type          | Collation | Nullable | Default
-------------------------+------------------------+-----------+----------+--------
 uuid                    | character varying(255) |           | not null |
 username                | character varying(255) |           |          |
 public_url              | character varying(255) |           |          |
 private_url             | character varying(255) |           |          |
 prefix                  | character varying(255) |           |          |
 share                   | json                   |           |          |
 owner_access            | bigint                 |           |          |
 owner                   | character varying(255) |           |          |
 global_access           | bigint                 |           |          |
 password                | character varying(255) |           |          |
 parent_uuid             | character varying(255) |           |          |
 parent_type             | character varying(255) |           |          |
 name                    | character varying(255) |           |          |
 uuid_mslong             | bigint                 |           |          |
 uuid_lslong             | bigint                 |           |          |
 user_visible            | boolean                |           |          |
 permissions_owner_access| bigint                 |           |          |
 permissions_owner       | character varying(255) |           |          |
 other_access            | bigint                 |           |          |
 group_access            | bigint                 |           |          |
 group                   | character varying(255) |           |          |
 last_modified           | character varying(255) |           |          |
 enable                  | boolean                |           |          |
 description             | character varying(255) |           |          |
 creator                 | character varying(255) |           |          |
 created                 | character varying(255) |           |          |
 fq_name                 | json                   |           |          |
 enable_proxy            | boolean                |           |          |
 display_name            | character varying(255) |           |          |
 configuration_version   | bigint                 |           |          |
 key_value_pair          | json                   |           |          |
```

FIG. 4

```
contrail_test=# select uuid, prefix, private_url from endpoint;
             uuid                     |  prefix    |       private_url
--------------------------------------+------------+--------------------------
 277c874f-dab2-4c5b-aa57-1376e1564740 | baremetal  | http://10.87.6.1:6385
 27de92d7-3e29-4cb7-ae38-bf8863d2bb42 | telemetry  | http://10.87.6.1:8081
 2be26edf-2ec7-45fc-9f33-9341576d1838 | compute    | http://10.87.6.1:8774
 66c2961c-f2e8-44c1-a53f-be5acbbad7e6 | config     | http://10.87.6.1:8082
 9b329e92-d42e-41b0-95c6-660ded3385b1 | swift      | http://10.87.6.1:8080
 ad30a83b-41cd-4d4b-b5f4-9ececddf83b1 | nodejs     | https://10.87.6.1:8143
 db14cc27-52eb-429f-8d28-92f1821a8c90 | keystone   | http://10.87.6.1:5000
 fca9dc80-ce0c-4a9e-bc40-352f3be889c5 | glance     | http://10.87.6.1:9292
(8 rows)
```

FIG. 5A

```
contrail_test=# select prefix, parent_uuid, parent_type from endpoint;
  prefix   |             parent_uuid              |    parent_type
-----------+--------------------------------------+------------------
 baremetal | ac28718e-63f5-4dae-907f-ba459c883d26 | contrail-cluster
 telemetry | ac28718e-63f5-4dae-907f-ba459c883d26 | contrail-cluster
 compute   | ac28718e-63f5-4dae-907f-ba459c883d26 | contrail-cluster
 config    | ac28718e-63f5-4dae-907f-ba459c883d26 | contrail-cluster
 swift     | ac28718e-63f5-4dae-907f-ba459c883d26 | contrail-cluster
 nodejs    | ac28718e-63f5-4dae-907f-ba459c883d26 | contrail-cluster
 keystone  | ac28718e-63f5-4dae-907f-ba459c883d26 | contrail-cluster
 glance    | ac28718e-63f5-4dae-907f-ba459c883d26 | contrail-cluster
(8 rows)
```

FIG. 5B

```
curl 'https://10.87.6.2:9091/keystone/v3/auth/tokens' -H 'x-cluster-id:
ac20718e-63f5-4dae-907f-ba459c883d28' -H 'cookie: region=RegionOne;
username=admin; domain-display-name=default-domain; domain=default-domain;
project=admin; project-display-name=admin;
connect.sid=s%3AiLLoxdxCfd0pCgWq%2FhNLDtSh.2jjtSuFP0jrS8K5IL%2FsxNBqzwnYmMs
WZUfukYc51Dig; x-auth-token=0a4677a5343045f90e4266d0aacdc63a' -H 'origin:
https://10.87.6.2:9091' -H 'accept-encoding: gzip, deflate, br' -H
'accept-language: en-US,en;q=0.9,ta-IN;q=0.8,ta;q=0.7' -H 'user-agent:
Mozilla/5.0 (Macintosh; Intel Mac OS X 10_12_6) AppleWebKit/537.36 (KHTML,
like Gecko) Chrome/72.0.3626.119 Safari/537.36' -H 'content-type:
application/json' -H 'accept: */*' -H 'referer: https://10.87.6.2:9091/' -H
'authority: 10.87.6.2:9091' -H 'x-requested-with: XMLHttpRequest'
--data-binary
'{"auth":{"identity":{"methods":["password"],"password":{"user":{"name":"ad
min","domain":{"id":"default"},"password":"contrail123"}}}}}' --compressed
--insecure
```

FIG. 6A

```
curl
'https://10.87.6.2:9091/proxy/ac20718e-63f5-4dae-907f-ba459c883d28/nodejs/a
pi/tenants/config/get-config-details' -H 'cookie: region=RegionOne;
username=admin; domain-display-name=default-domain; domain=default-domain;
project=admin; project-display-name=admin;
connect.sid=s%3AO4vRuP22IvlkjqY3dfZ%2B8aSO.SR7c20IHs19aUtcDyxIxwzDBVh6Uyq8z
eIVsH3jlRX8; x-auth-token=57fae7851b32433680e3eb4cd4193f5b' -H 'origin:
https://10.87.6.2:9091' -H 'accept-encoding: gzip, deflate, br' -H
'accept-language: en-US,en;q=0.9,ta-IN;q=0.8,ta;q=0.7' -H 'user-agent:
Mozilla/5.0 (Macintosh; Intel Mac OS X 10_12_6) AppleWebKit/537.36 (KHTML,
like Gecko) Chrome/72.0.3626.119 Safari/537.36' -H 'content-type:
application/json' -H 'accept: */*' -H 'referer: https://10.87.6.2:9091/' -H
'x-auth-token: 57fae7851b32433680e3eb4cd4193f5b' -H 'authority:
10.87.6.2:9091' -H 'x-requested-with: XMLHttpRequest' --data-binary
'{"data":[{"type":"global-system-configs"}]}' --compressed --insecure
```

FIG. 6B

MULTI-CLUSTER CONFIGURATION CONTROLLER FOR SOFTWARE DEFINED NETWORKS

CROSS REFERENCE

This application is a continuation of U.S. patent application Ser. No. 16/451,452, filed 25 Jun. 2019, which claims the benefit of U.S. Provisional Patent Application No. 62/838,640, filed 25 Apr. 2019, the entire content of each application is incorporated herein by reference.

TECHNICAL FIELD

This disclosure relates to software defined networks for cloud computing domains and, more specifically, to configuring and/or provisioning SDN controllers within different domains.

BACKGROUND

In a typical cloud data center environment, a large collection of interconnected servers often provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

A cloud computing infrastructure that manages deployment and infrastructure for application execution may involve two main roles: (1) orchestration—for automating deployment, scaling, and operations of applications across clusters of hosts and providing computing infrastructure, which may include virtual machines (VMs) or container-centric computing infrastructure; and (2) network management—for creating virtual networks in the network infrastructure to enable communication among applications running on virtual execution environments, such as containers or VMs, as well as among applications running on legacy (e.g., physical) environments. Software-defined networking contributes to network management.

Multi-cloud environment refers to the use of multiple clouds for computing and storage services. An enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise.

SUMMARY

This disclosure describes techniques for configuring software defined network (SDN) controllers within different cloud computing domains and, in particular, a multi-cluster controller that operates and presents, in some examples, a single interface for seamlessly controlling and configuring SDN controllers in different cloud computing domains. In some examples, the techniques include the multi-cluster command controller that operates to transparently proxy configuration requests, issued by one or more users or administrators, to service provided by SDN controllers (referred to herein as endpoints) across a plurality of clusters within a network. In some examples, such techniques may include use of a proxy system that receives configuration requests from administers, parses a given configuration request to identify a cluster and a particular service offered by the SDN controller of the cluster, i.e., the endpoint of the SDN controller, to which the configurations are to be applied, and routes information about the configuration request to the appropriate endpoint. Such techniques may further include appropriately authenticating users, which may include storing, within the proxy system information about authentication credentials that may be associated with a user for a particular cluster or endpoint. Such techniques may also include dynamically maintaining a database of cluster objects and/or objects within a cluster as configurations involving endpoints and clusters are performed or as endpoints and clusters are otherwise managed.

The techniques described herein may provide certain technical advantages. For instance, a system that operates to proxy configuration traffic across any number of clusters may enable efficient multi-cluster configuration of endpoints and related objects, in some examples using only a single controller with a single set of authentication credentials for each user. Further, by including, within each configuration request, information (e.g., such as a prefix) that enables a proxy system to identify the endpoint that the configuration request pertains to, the proxy system may be able to efficiently route configuration requests to the appropriate endpoint. Further, by maintaining prefix and cluster information in a data store or a cache, a system that proxies requests across multiple clusters may operate with little or no additional latency as compared to directly configuring endpoints without a proxy.

In some examples, this disclosure describes operations performed by a computing system capable of communicating with a plurality of clusters in accordance with one or more aspects of this disclosure. In one specific example, this disclosure describes a method comprising authenticating, by a computing system, a user to manage a plurality of configurable endpoints across a plurality of clusters; receiving, by the computing system, a plurality of requests, each specifying a configuration operation within a different cluster within the plurality of clusters; identifying, for each of the requests, a configuration cluster from among the plurality of clusters; identifying, for each of the requests, a configuration endpoint within the identified configuration cluster; communicating with each of the identified endpoints, by the computing system and for each respective request, to perform the corresponding configuration operation; and updating a data store, by the computing system and for each respective configuration operation, to include information about the configuration.

In another specific example, this disclosure describes a computing system comprising processing circuitry and a storage device, wherein the processing circuitry has access to the storage device and is configured to: communicate with a plurality of computing clusters, including a first cluster comprising a first SDN controller and a first configurable endpoint, and a second cluster comprising a second SDN controller and a second configurable endpoint; receive a first request specifying a first configuration operation; determine that the first configuration operation is to be performed on the first configurable endpoint within the first cluster; communicate with the first configurable endpoint within the first cluster to perform the first configuration operation, wherein communicating with the first endpoint includes accessing a first set of authentication credentials for the first configuration endpoint; receive a second request specifying a second configuration operation; determine that the second configuration operation is to be performed on the second configurable endpoint within the second cluster; communicate with the second configurable endpoint within the second cluster to perform the second configuration operation, wherein communicating with the second endpoint includes accessing a second set of authentication credentials for the second configuration endpoint; and update a data store to include information about the first configuration operation and the second configuration operation.

In another example, this disclosure describes a computer-readable medium comprising instructions that, when executed, configure processing circuitry of a computing system to: communicate with a plurality of computing clusters, including a first cluster comprising a first SDN controller and a first configurable endpoint, and a second cluster comprising a second SDN controller and a second configurable endpoint; receive a first request specifying a first configuration operation; determine that the first configuration operation is to be performed on the first configurable endpoint within the first cluster; communicate with the first configurable endpoint within the first cluster to perform the first configuration operation, wherein communicating with the first endpoint includes accessing a first set of authentication credentials for the first configuration endpoint; receive a second request specifying a second configuration operation; determine that the second configuration operation is to be performed on the second configurable endpoint within the second cluster; communicate with the second configurable endpoint within the second cluster to perform the second configuration operation, wherein communicating with the second endpoint includes accessing a second set of authentication credentials for the second configuration endpoint; and update a data store to include information about the first configuration operation and the second configuration operation.

The foregoing is a simplified summary to provide background for some aspects of the disclosure, and is neither intended to identify key or critical elements of the disclosure nor to delineate or limit the scope of the disclosure. Instead, the foregoing merely presents some concepts in a simplified form as a prelude to the description below.

BRIEF DESCRIPTION OF THE DRAWINGS

FIG. 4 is a conceptual illustration of an example database table that may be used to store information about endpoint configurations, in accordance with one or more aspects of the present disclosure.

FIG. 5A and FIG. 5B are conceptual illustrations of a table of object identifiers, endpoint prefixes, object types, and corresponding URLs, in accordance with one or more aspects of the present disclosure.

FIG. 6A is an example REST API call that may be received by an example computing system that serves as a configuration proxy, in accordance with one or more aspects of the present disclosure.

FIG. 6B is an example REST API call that may be initiated by an example computing system to an endpoint for the purpose of configuring that endpoint, in accordance with one or more aspects of the present disclosure.

DETAILED DESCRIPTION

Figure 1:
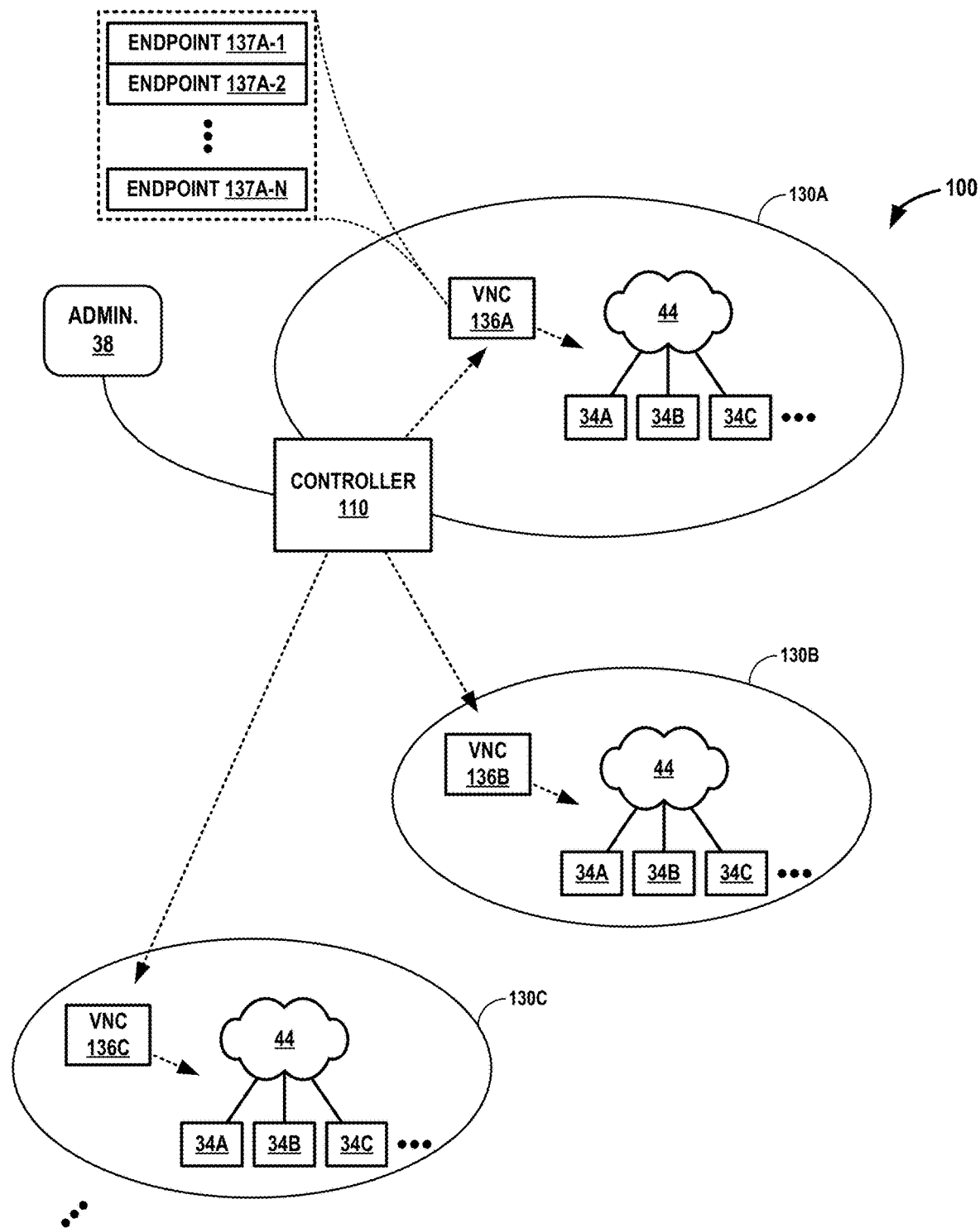
FIG. 1 is a conceptual diagram illustrating an example network in which a configuration proxy provides a single interface point for seamlessly configuring individual SDN controllers deployed within different cloud domains in accordance with one or more aspects of the present disclosure.

FIG. 1 is a conceptual diagram illustrating an example network in which multiple clusters may be configured, in accordance with one or more aspects of the present disclosure. The example of FIG. 1 illustrates a computing system or controller 110 interacting with one or more of software defined networks (SDNs) arranged as cloud-computing cluster 130A, cluster 130B, and cluster 130C (collectively, "clusters 130," and representing any number of clusters). Each of cloud-computing clusters 130 is implemented by computing infrastructure that may be virtualized to support one or services implemented by the cluster. For instance, one or more of clusters 130 may be provisioned on a plurality of servers hosted on a network (e.g., Internet) to store, manage, and process data, or perform other functions.

In some examples, one or more of clusters 130 may be on-premises of an enterprise, where some or all of other clusters 130 are remote. In other examples, some or all of clusters 130 may be remote from the enterprise. Further, in some examples, clusters 130 may all be included within a single data center. In still other examples, each of clusters 130 may be deployed within its own data center, or possibly, one or more of clusters 130 may span multiple data centers or geographic regions.

In the example of FIG. 1, controller 110 may receive configuration requests from a computing device operated by administrator 38 (or other appropriately authorized user) communicating with controller 110 either directly or over a network. FIG. 1 includes a plurality of software defined network controllers, referred to herein as virtual network controller 136A, 136B, and 136C (collectively, "virtual network controllers 136") each within clusters 130A, 130B, and cluster 130C, respectively. Each of virtual network controllers 136 configure aspects of their respective cluster 130, and may be implemented through a computing device and/or processing circuitry, whether physical or virtual. Further example details of a VNC 136 operating as a software defined network controller to configure overlay and/or underlay network elements within a computing domain are described in U.S. Pat. No. 8,755,377, filed Mar. 15, 2013, U.S. Pat. No. 10,200,274, filed Mar. 31, 2017, and U.S. patent application Ser. No. 15/823,906 filed Nov. 28, 2017, all of which are hereby incorporated by reference.

In some examples, each of virtual network controllers 136A may include or be implemented by one or more configurable services referred to herein as endpoints of the SDN controller. Virtual network controller 136A in the example of FIG. 1 is shown implemented by, composed by, or including endpoint 137A-1 through and endpoint 137A-N (collectively "endpoints 137A" or "endpoints 137" and representing any number of endpoints). Although not specifically shown in FIG. 1, virtual network controller 136B may also be implemented by or composed by a number of endpoints (e.g., endpoint 137B-1 through endpoint 137B-N, or collectively, "endpoints 137B"). Similarly, virtual network controller 136C may be implemented with using a number of endpoints (e.g., endpoint 137C-1 through endpoint 137C-N, or collectively "endpoints 137C").

In each of clusters 130, endpoints 137 may represent a different service offered or performed by the respective VNC of that cluster 130. In some examples, each of endpoints 137 may be configurable through an API (application programming interface) exposed by the corresponding endpoint 137. Endpoints 137 may provide any of a number of different types of services for managing an overlay and/or underlay network of the respective cloud-computing domain 130, including authentication (e.g., OpenStack's Keystone service), image management (e.g., OpenStack's Glance service), storage (e.g., OpenStack's Swift service), analytics, telemetry, or other services, each provided through one or more endpoints 137. In some examples, each of endpoints 137 of VNC 136A within cluster 130A (or within clusters 130 generally) operates as a different service that can be configured, such as a different process, virtual machine, container, or the like, for implementing the functions of the SDN controller. Each of clusters 130 further include a corresponding network 44 and any number of servers (e.g., servers 34A, 34B, and 34C) for providing compute resources. In general, each of components illustrated in FIG. 1 (e.g., computing systems 110, clusters 130, virtual network controllers 136 within each of 130, and servers 34 within each of clusters 130) may communicate over one or more networks, which may be or include the internet or any public or private communications network or other network. Such networks may include one or more of networks 44 within clusters 130.

To enable configuration of aspects of virtual network controller 136A (or any of endpoints 137A included within virtual network controller 136A), virtual network controller 136A exposes an API that may be accessible (e.g., through a web browser interface) to an authenticated administrator (e.g., administrator 38) operating a client computing device. In some examples, each of endpoints 137A within virtual network controller 136A may expose its own API to enable configuration of the service corresponding to that endpoint 137A. Administrator 38 may also separately configure virtual network controller 136B or aspects of any of endpoints 137B by using a client computing device to authenticate and then access an API exposed by virtual network controller 136B or any of endpoints 137B. Similarly, administrator 38 may also separately configure aspects of virtual network controller 136C or any of endpoints 137C by authenticating and accessing an API exposes by virtual network controller 136C or any of endpoints 137C.

Rather than managing and configuring each of virtual network controllers 136 (or endpoints 137) separately, controller 110 may, as described herein, enable an administrator to manage and/or configure involving any of virtual network controllers 136 or endpoints 137 from a centralized device, or from a single point of contact. In some examples, controller 110 may serve as a dynamic proxy that provides a single point of contact to manage aspects of multiple clusters 130. Controller 110 may be included within cluster 130A (as shown in FIG. 1), but in other examples, controller 110 may be located elsewhere, within another one of clusters 130, distributed across multiple clusters 130, or outside of all clusters 130. As further described herein, administrator 38 may manage one or more of clusters 130 by issuing configuration requests to controller 110, and controller 110 may proxy the requests to one or more of clusters 130, where the configurations are performed. One or more systems included within each of clusters 130 may respond to or otherwise communicate with controller 110, and controller 110 may use information derived from those communications to generate a user interface for presentation to administrator 38 (i.e., to a computing device operated by administrator 38). In addition, controller 110 may operate dynamically by detecting or sensing configuration changes involving one or more clusters 130, and updating a data store of information about each of clusters 130. In some examples, a cache may be used for storing some of the information included within the data store, to thereby reduce latency that might otherwise arise when performing configurations through controller 110, rather than directly through one or more of virtual network controllers 136.

In accordance with one or more aspects of the present disclosure, controller 110 may manage or configure one or more aspects of one or more clusters 130. For instance, in an example that can be described with reference to FIG. 1, controller 110 detects input from a computing device operated by administrator 38 and determines that administrator 38 is an authenticated user. Controller 110 detects further input and determines that the input corresponds to a request to configure one or more aspects of virtual network controller 136A within cluster 130A. Specifically, controller 110 determines that the input includes information identifying cluster 130A and endpoint 137A-1 within cluster 130A and an indication of the configuration operation to be performed on endpoint 137A-1. Controller 110 communicates with endpoint 137A-1 to perform the configuration operation specified by the input or otherwise manage endpoint 137A-1. In some examples, the configuration operation may involve management of an existing one of clusters 130. In other examples, the configuration operation may involve creating a new cluster and associated endpoints within that new cluster.

In some examples, controller 110 accesses, upon receiving a configuration request, a data store (not shown in FIG. 1) that includes information about clusters 130 and endpoints 137. Controller 110 may use information accessed within the data store to identify the specific cluster 130 and/or endpoint 137 to be configured, and also to route the configuration request to the appropriate endpoint 137 and the appropriate cluster 130. Controller 110 may update the data store as endpoints 137 are managed or as configurations are performed. Controller 110 may also update the data store when controller 110 otherwise detects configurations being performed, thereby dynamically updating the data store. Controller 110 may also maintain a cache of information from the data store (e.g., as a key-value store of endpoint information) to enable controller 110 to quickly identify the appropriate endpoint 137 and cluster 130 for a given configuration request.

Through techniques in accordance with one or more aspects of the present disclosure, such as by implementing controller 110 as a proxy for configuring clusters 130, network 100 may enable configuration of multiple clusters 130 through a single controller, and using a single set of authentication credentials. Such an implementation may result in a more efficient way of configuring multiple clusters 130 because administering multiple clusters 130 may be performed without accessing multiple systems independently.

Further, by dynamically maintaining information about multiple clusters in a data store included within controller 110, controller 110 may efficiently identify, for a given configuration request received from administrator 38, which of endpoints 137 across multiple clusters 130 are being managed. By identifying the appropriate endpoint 137 associated with a given configuration request, controller 110 may efficiently route the configuration request to the appropriate cluster 130 and the appropriate endpoint 137 within that cluster 130. Further, by caching information about endpoints 137, controller 110 may perform techniques described herein while introducing little or no latency.

Figure 2:
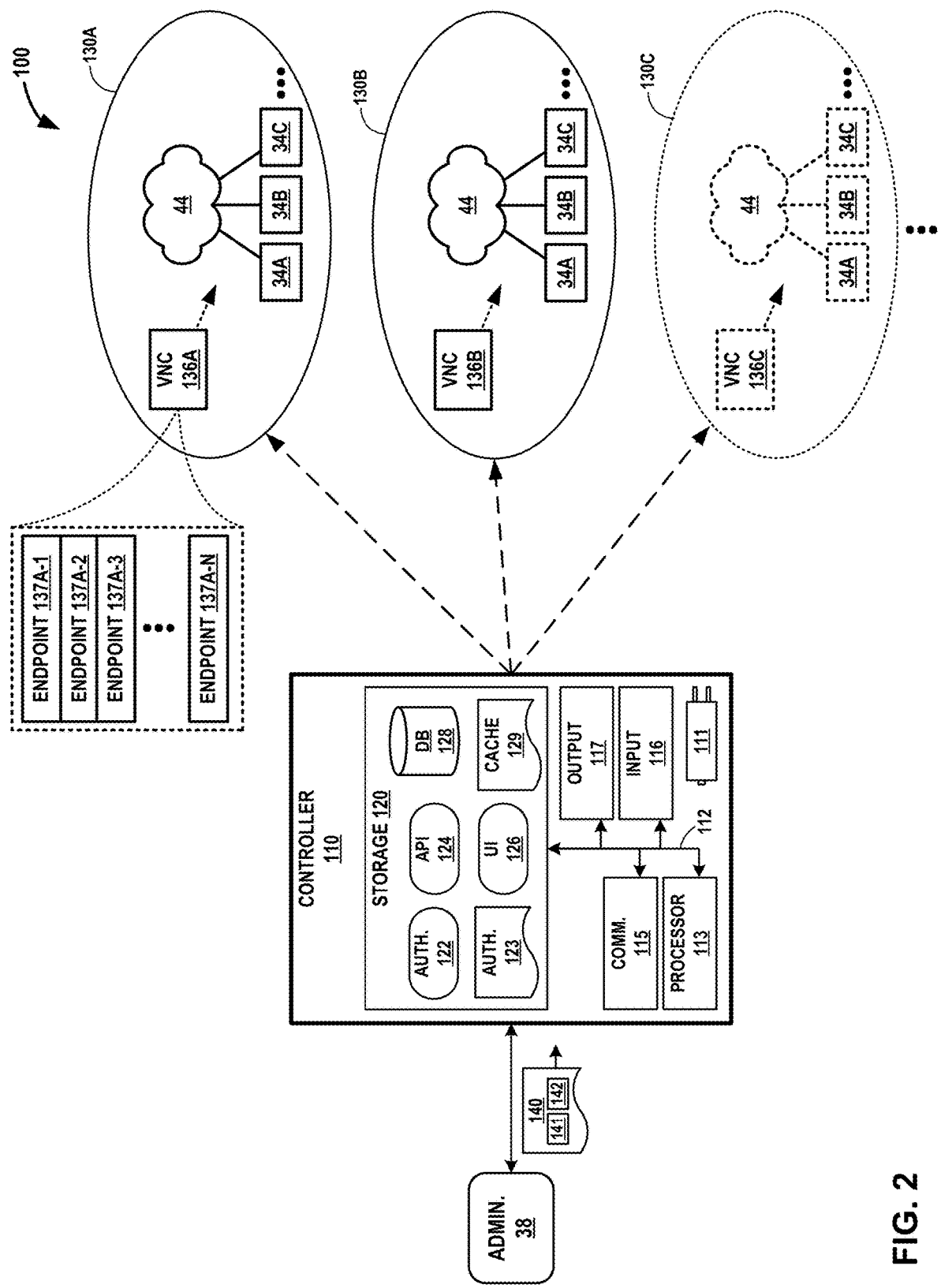
FIG. 2 is a block diagram illustrating an example network that dynamically proxies configuration requests to one or more clusters in a multi-cluster SDN cloud domain environment, in accordance with one or more aspects of the present disclosure.

FIG. 2 is a block diagram illustrating an example network that dynamically proxies configuration requests to one or more clusters in a multi-cluster environment, in accordance with one or more aspects of the present disclosure. Network 100 of FIG. 2 may be described as an example or alternative implementation of network 100 of FIG. 1. One or more aspects of FIG. 2 may be described herein within the context of FIG. 1.

In FIG. 2, and as in FIG. 1, network 100 includes a computing system or controller 110 interacting with one or more of clusters 130 (i.e., clusters 130A, 130B, 130C). In the example of FIG. 2, cluster 130C is illustrated with a dotted line to indicate that it is described herein as a cluster that may be instantiated or brought online as a result of operations performed by controller 110, as further described below. Included within each of clusters 130 are virtual network controllers 136 (e.g., virtual network controller 136A within cluster 130A) and one or more networks 44, each supported by a plurality of servers 34 (e.g., servers 34A through 34N). Each of virtual network controllers 136 includes, as described in connection with FIG. 1, one or more endpoints 137 (e.g., virtual network controller 136A includes or is composed of endpoints 137A-1 through 137A-N).

In general, each of clusters 130, as well as the components included with each of clusters 130, may correspond to like-numbered elements of FIG. 1. Such devices, systems, and/or components may be implemented in a manner consistent with the description of the corresponding system provided in connection with FIG. 1, although in some examples such systems may involve alternative implementations with more, fewer, and/or different capabilities. In general, systems, devices, components, user interface elements, and other items in Figures herein may correspond to like-numbered systems, devices, components, and items illustrated in other Figures, and may be described in a manner consistent with the description provided in connection with other Figures. For ease of illustration, a limited number of clusters 130, endpoints 137, systems and/or components within clusters 130, administrators 38, computing systems 110, and other components are illustrated in FIG. 2, although techniques in accordance with one or more aspects of the present disclosure may be performed with many more of such systems.

Controller 110 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, controller 110 represents a cloud computing system, server farm, and/or server cluster (or portion thereof) that provides services to client devices and other devices or systems. In other examples, controller 110 may represent or be implemented through one or more virtualized compute instances (e.g., virtual machines, containers) of a data center, cloud computing system, server farm, and/or server cluster.

In the example of FIG. 2, controller 110 may include power source 111, one or more processors 113, one or more communication units 115, one or more input devices 116, one or more output devices 117, and one or more storage devices 120. Storage devices 120 may include authentication module 122, authentication data 123, API module 124, user interface module 126, data store 128, and cache 129. One or more of the devices, modules, storage areas, or other components of controller 110 may be interconnected to enable inter-component communications (physically, communicatively, and/or operatively). In some examples, such connectivity may be provided by through communication channels (e.g., communication channels 112), a system bus, a network connection, an inter-process communication data structure, or any other method for communicating data.

Power source 111 may provide power to one or more components of controller 110. Power source 111 may receive power from the primary alternating current (AC) power supply in a building, home, or other location. In other examples, power source 111 may be a battery or a device that supplies direct current (DC). In still further examples, controller 110 and/or power source 111 may receive power from another source. One or more of the devices or components illustrated within controller 110 may be connected to power source 111, and/or may receive power from power source 111. Power source 111 may have intelligent power management or consumption capabilities, and such features may be controlled, accessed, or adjusted by one or more modules of controller 110 and/or by one or more processors 113 to intelligently consume, allocate, supply, or otherwise manage power.

One or more processors 113 of controller 110 may implement functionality and/or execute instructions associated with controller 110 or associated with one or more modules illustrated herein and/or described below. One or more processors 113 may be, may be part of, and/or may include processing circuitry that performs operations in accordance with one or more aspects of the present disclosure. Examples of processors 113 include microprocessors, application processors, display controllers, auxiliary processors, one or more sensor hubs, and any other hardware configured to function as a processor, a processing unit, or a processing device. Central monitoring system 210 may use one or more processors 113 to perform operations in accordance with one or more aspects of the present disclosure using software, hardware, firmware, or a mixture of hardware, software, and firmware residing in and/or executing at controller 110.

One or more communication units 115 of controller 110 may communicate with devices external to controller 110 by transmitting and/or receiving data, and may operate, in some respects, as both an input device and an output device. In some examples, communication unit 115 may communicate with other devices over a network. In other examples, communication units 115 may send and/or receive radio signals on a radio network such as a cellular radio network. In other examples, communication units 115 of controller 110 may transmit and/or receive satellite signals on a satellite network such as a Global Positioning System (GPS) network. Examples of communication units 115 include a network interface card (e.g. such as an Ethernet card), an optical transceiver, a radio frequency transceiver, a GPS receiver, or any other type of device that can send and/or receive information. Other examples of communication units 115 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 116 may represent any input devices of controller 110 not otherwise separately described herein. One or more input devices 116 may generate, receive, and/or process input from any type of device capable of detecting input from a human or machine. For example, one or more input devices 116 may generate, receive, and/or process input in the form of electrical, physical, audio, image, and/or visual input (e.g., peripheral device, keyboard, microphone, camera).

One or more output devices 117 may represent any output devices of controller 110 not otherwise separately described herein. One or more output devices 117 may generate, receive, and/or process output from any type of device capable of outputting information to a human or machine. For example, one or more output devices 117 may generate, receive, and/or process output in the form of electrical and/or physical output (e.g., peripheral device, actuator).

One or more storage devices 120 within controller 110 may store information for processing during operation of controller 110. Storage devices 120 may store program instructions and/or data associated with one or more of the modules described in accordance with one or more aspects of this disclosure. One or more processors 113 and one or more storage devices 120 may provide an operating environment or platform for such modules, which may be implemented as software, but may in some examples include any combination of hardware, firmware, and software. One or more processors 113 may execute instructions and one or more storage devices 120 may store instructions and/or data of one or more modules. The combination of processors 113 and storage devices 120 may retrieve, store, and/or execute the instructions and/or data of one or more applications, modules, or software. Processors 113 and/or storage devices 120 may also be operably coupled to one or more other software and/or hardware components, including, but not limited to, one or more of the components of controller 110 and/or one or more devices or systems illustrated as being connected to controller 110.

In some examples, one or more storage devices 120 are temporary memories, meaning that a primary purpose of the one or more storage devices is not long-term storage. Storage devices 120 of controller 110 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 120, in some examples, also include one or more computer-readable storage media. Storage devices 120 may be configured to store larger amounts of information than volatile memory. Storage devices 120 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Authentication module 122 may perform functions relating to processing authentication credentials and authenticating users. Authentication module 122 may authenticate users to enable such users to access, manage, or configure specific clusters 130 or may also authenticate users to access, manage, or configure services or endpoints across multiple clusters, thereby enabling multi-cluster management of endpoints. Authentication module 122 may manage authentication data 123 and/or may store information to and access information from authentication data 123. Authentication data 123 may include information derived from information received in communications with administrator 38 or with one or more of clusters 130.

API module 124 may perform functions relating to performing multi-cluster management or configuration of one or more endpoints 137 within clusters 130. API module 124 may process requests 140 and identify one or more endpoints to configure or manage and how such endpoints are to be configured or managed. API module 124 may access data store 128 and/or cache 129 to identify a public or private URL for an endpoint to be configured. API module 124 may cause communication unit 115 to communicate with clusters 130 to create one or more new clusters 130 or to configure one or more aspects (e.g., endpoints) within new or existing clusters 130. API module 124 may generate and/or process REST API calls. For instance, API module 124 may process REST API calls received by controller 110 from administrator 38, and may generate REST API calls that controller 110 communicates to one or more endpoints 137 within clusters 130. API module 124 may receive information from and output information to one or more other modules, and may otherwise interact with and/or operate in conjunction with one or more other modules of controller 110. In some examples, functions performed by API module 124 could be performed by software or by a hardware device executing software. In other examples, functions performed by API module 124 may be implemented primarily or partially through hardware.

User interface module 126 may perform functions relating to generating graphical user interfaces (or other types of user interfaces) for presentation at a computing device operated by one or more administrators 38. For instance, user interface module 126 may generate data underlying authentication web pages. User interface module 126 may also generate data underlying web pages that present display objects that management, in a multi-cluster fashion, of clusters 130 or endpoints 137 within clusters 130. Such user interfaces may have form similar to user interfaces 700 illustrated in FIG. 7A through 7E.

Data store 128 may represent any suitable data structure or storage medium for storing information related to endpoints within a cluster. Data store 128 may store information about endpoint types and other information used to configure endpoints 137 or to report information about current or available configurations of one or more endpoints 137. In some examples, data store 128 may include a relational database and/or table for a SQL database (e.g., a PostgreSQL database) having the form illustrated in FIG. 4. The information stored in data store 128 may be searchable and/or categorized such that one or more modules within controller 110 may provide an input requesting information from data store 128, and in response to the input, receive information stored within data store 128. Data store 128 may be primarily maintained by API module 124.

Cache 129 may represent any suitable data store for storing subsets of data from data store 128. Typically, cache 129 is smaller than data store 128 and has a faster access time than data store 128, thereby enabling faster access to information that is stored in cache 129. In some examples, cache 129 may be implemented as a key-value store that uses prefix 141 as a key for identifying an endpoint associated with a configuration request. Cache 129 may have a form similar to that of FIG. 5A, where a universally unique identifier ("UUID") and a prefix are used as a key to identify a private URL for an endpoint specified by a configuration request. Cache 129 may be created or updated by API module 124 when one or more new endpoints 137 are instantiated or brought online, or when detecting configurations to one or more endpoints 137.

In the example of FIG. 2, and in accordance with one or more aspects of the present disclosure, controller 110 may authenticate administrator 38. For instance, in an example that can be described with reference to FIG. 2, communication unit 115 of controller 110 detects input and outputs to authentication module 122 information about the input. Authentication module 122 determines that the input corresponds to a request to authenticate a user (e.g., administrator 38). Authentication module 122 outputs information to user interface module 126. User interface module 126 generates a user interface with a username and password prompt. User interface module 126 causes communication unit 115 to output information to administrator 38 (or a computing device operated by administrator 38), such as over a network. The information controller 110 outputs to administrator 38 is sufficient to generate a username/password user interface, and upon receiving the information, a computing device operated by administrator 38 presents the user interface (e.g., at a display). Communication unit 115 thereafter detects input and outputs information about the input to authentication module 122. Authentication module 122 determines, based on the information about the input, that the input corresponds to valid authentication credentials from administrator 38.

Controller 110 may receive further input identifying a cluster and endpoint. For instance, with reference to FIG. 2, communication unit 115 of controller 110 detects input and outputs to API module 124 information about the input. API module 124 analyzes the input and determines that the input corresponds to a request to configure or manage one or more aspects of clusters 130. In the example of FIG. 2, the input corresponds to request 140. API module 124 further determines that request 140 corresponds to a request to configure endpoint 137A-1 in cluster 130A. In some examples, request 140 may correspond to or include a REST API request generated by a computing device operated by administrator 38 and communicated to controller 110 over a network. In such an example, request 140 may have a form similar to the REST API call illustrated in FIG. 6A.

To identify endpoint 137A-1, API module 124 may extract, from request 140, prefix 141 and identifier 142. Identifier 142 may be a UUID associated with, and identifying, cluster 130A (in the example being described, identifier 142 identifies cluster 130A). Prefix 141 may be information specifying one or more of endpoints 137 within cluster 130A to be configured (in the example being described, prefix 141 identifies endpoint 137A-1). In some examples, a URL for an endpoint may have the form "http://<endpointListenIP>:<endpointListenPort>", where "endpointListenIP" is the IP address that the endpoint uses to listen for configuration requests or management communications, and where "endpointListenPort" is the port that the endpoint uses at that IP address to listen for configuration requests and/or management communications. Accordingly, a public and/or private URL for an endpoint that implements an OpenStack Keystone authentication service will have the form "http://<KeystoneListenIP>:<KeystoneListenPort>" where "KeystoneListenIP" is the IP address of the Keystone service endpoint, and the "KeystoneListenPort" is the port at the KeystoneListenIP where requests relating to the Keystone service are received. Endpoint services include analytics services, configuration services, and other services; such services may include those sometimes referred to as nodejs, telemetry, swift, glance, compute, baremetal, as well as other custom endpoint services.

After identifying the endpoint and cluster associated with request 140, controller 110 may configure endpoint 137A-1 within cluster 130A. For instance, again referring to FIG. 2 and after receiving request 140, API module 124 outputs, to authentication module 122, a request for authentication information associated endpoint 137A-1 within cluster 130A. Authentication module 122 access authentication data 123 and accesses authentication credentials (e.g., a username and password combination) for authenticated administrator 38. API module 124 identifies, by accessing 128 and/or cache 129, a URL/port combination for endpoint 137A-1. Authentication module 122 causes communication unit 115 to securely output the authentication credentials to cluster 130A, and specifically, to endpoint 137A-1 within cluster 130A. Endpoint 137A-1 determines that the authentication credentials are valid. API module 124 causes communication unit 115 to further communicate with endpoint 137A-1 to perform the configurations specified in request 140. In some examples, the configurations may include modifications made to existing endpoints 137, or addition or removal of one or more endpoints 137.

In other examples, the configurations may include the addition or removal of one or more endpoints 137 within 130A. In such an example, controller 110 may communicate with virtual network controller 136A to invoke services provided by an API exposed by virtual network controller 136A. Such services may enable controller 110 (or other authenticated devices) to add, remove, or otherwise configure one or more endpoints 137 within cluster 130A.

Controller 110 may update data store 128 to reflect configuration changes associated with cluster 130A. For instance, in the example of FIG. 2, API module 124 outputs, to data store 128, information about the configurations performed within cluster 130A. Data store 128 stores the information. In some examples, API module 124 (or data store 128) may also update cache 129, which may be implemented as an in-memory key-value endpoint store, to reflect changes to any changes to the endpoints as a result of the configurations performed within cluster 130A. In some examples, such changes may include new addresses, prefixes, or other information associated with endpoints within cluster 130A, or may include changes to reflect removal of one or more endpoints within cluster 130A.

In addition to configuring aspects of existing clusters 130, controller 110 may also create one or more new clusters, such as cluster 130C (illustrated as a dotted line in FIG. 2). In one example, controller 110 may receive a request to create cluster 130C. For instance, in the example of FIG. 2, controller 110 receives input that API module 124 determines corresponds to a request (e.g., from administrator 38) to create new cluster 130C. API module 124 creates an object within data store 128 to correspond to cluster 130C. API module 124 further creates one or more objects within data store 128 to correspond to endpoints 137 within cluster 130C. API module 124 may create new routes for each of the new endpoints 137 within cluster 130C, and store associated information within data store 128. API module 124 may cause communication unit 115 to communicate with one or more of virtual network controllers 136 to provision new cluster 130C and otherwise instantiate objects and/or systems within new cluster 130.

In some examples, API module 124 may also update cache 129 to include at least a subset of the information stored within data store 128. By doing so, when a new configuration or management request is received by controller 110, controller 110 may process the request by accessing information about the endpoint 137 specified in the request without accessing data store 128, thereby enabling low-latency access (i.e., through 129) to information otherwise accessible through data store 128. Cache 129 may, in some examples, enable controller 110 to serve as a proxy between administrator 38 and clusters 130 with little or no additional latency.

In some examples, to create cluster 130C, API module 124 causes communication unit 115 to communicate with one or more of virtual network controllers 136 to invoke services provided by virtual network controllers 136 for creating and establishing new cluster 130C and endpoints 137 included within new cluster 130C. In other examples, API module 124 may cause communication unit 115 to communicate with another system or higher-level service (not shown) that provides the capability for creating and/or establishing new cluster 130C and the endpoints 137C included within new cluster 130C. In still other examples, administrator 38 may use another tool to create and configure cluster 130C or to configure aspects of other clusters 130. In such an example, controller 110 may communicate with each of clusters 130 to determine any changes, additions, removals, or other modifications to clusters 130, and update data store 128 to reflect such changes. Alternatively, or in addition, controller 110 may receive input (e.g., from administrator 38) about changes that have been made or will be made to clusters 130 using a tool other than controller 110, and in that example, controller 110 may also update data store 128 to reflect such changes. Accordingly, controller 110 may operate dynamically to detect changes to any of clusters 130 (including additional clusters 130), and update, often automatically, data store 128 and/or cache 129.

After creating new cluster 130C, controller 110 may thereafter configure one or more endpoints 137C within new cluster 130C. For instance, still referring to FIG. 2, controller 110 may detect input that API module 124 determines corresponds to a request, from administrator 38, to configure one or more endpoints 137C within new cluster 130C. As previously described with respect to request 140, the request may include prefix 141 and identifier 142, with identifier 142 identifying cluster 130C and prefix 141 identifying which of endpoints 137C within cluster 130C to configure. API module 124 causes authentication module 122 to access authentication information for administrator 38 for one or more endpoints 137C within cluster 130C. API module 124 uses the authentication information to cause communication unit 115 to communicate with one or more endpoints 137C within cluster 130C and authenticate controller 110 to enable configurations within cluster 130C. API module 124 further causes communication unit 115 to output a configuration request (e.g., in the form of a REST API call) to one or more endpoints 137C within cluster 130C. In some examples, the configuration request may be a REST API call having a form similar to that illustrated in FIG. 6B. One or more endpoints 137C within 130C perform the requested configurations after receiving communications from controller 110. In connection with the configurations, API module 124 updates data stores 128 and cache 129 to include any new information about endpoints 137C within 130C that result from the configurations performed with respect to cluster 130C.

Modules illustrated in FIG. 2 (e.g., navigation module 122, communication module 124, analysis module 126, user interface module 151, recovery module 152, and transaction module 154) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
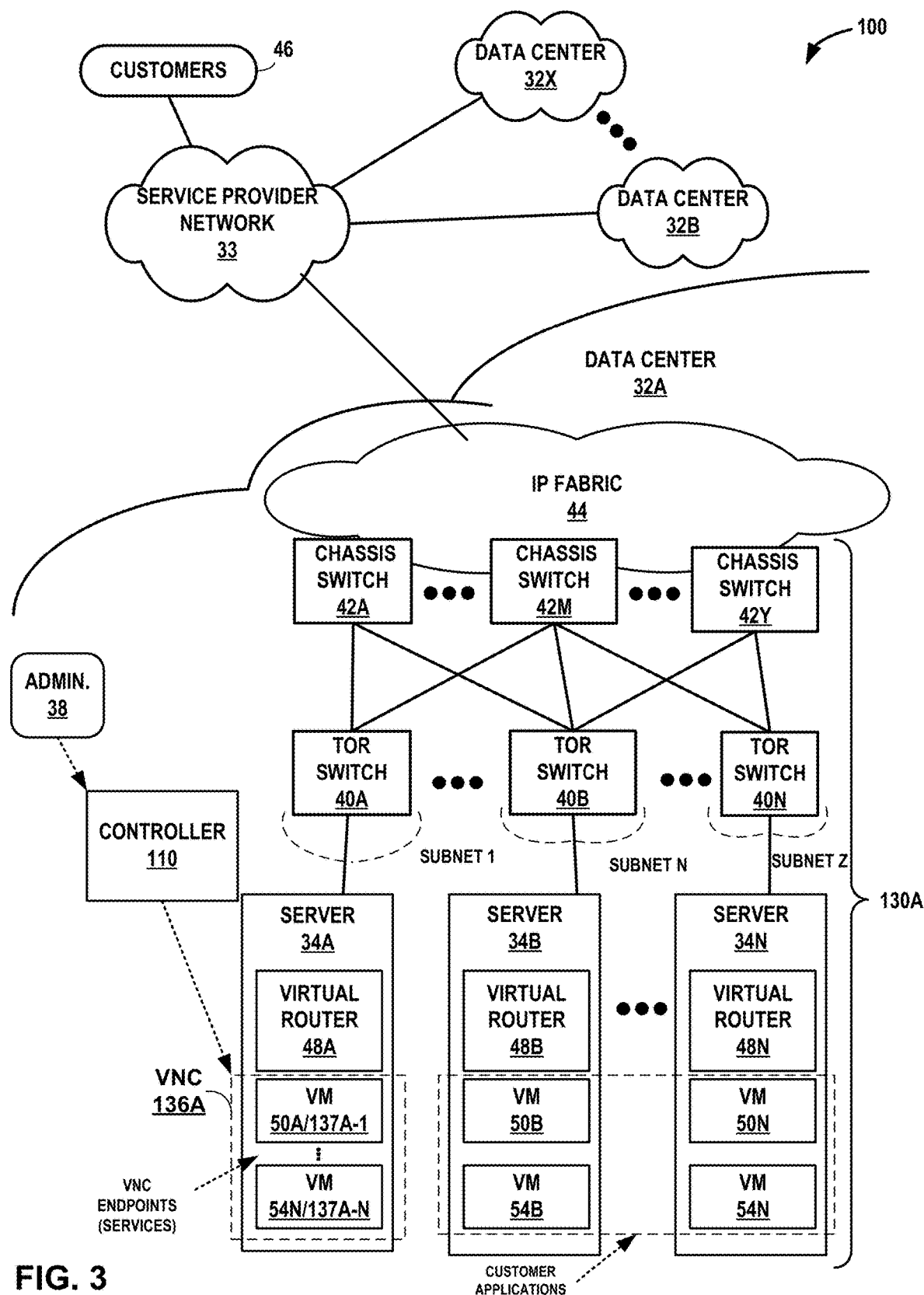
FIG. 3 is a block diagram illustrating an example multi-cluster or multi-cloud network having multiple data centers, in accordance with one or more aspects of the present disclosure.

FIG. 3 is a block diagram illustrating an example multi-cluster or multi-cloud network having multiple data centers, in accordance with one or more aspects of the present disclosure. Network 100 of FIG. 3 may be described as an example or alternative implementation of network 100 of FIG. 1 or FIG. 2. As in FIG. 1 and FIG. 2, many of the components illustrated in FIG. 3 may correspond to like-numbered elements previously described in connection with FIG. 1 and FIG. 2. In general, such like-numbered systems, devices, components, and items illustrated in FIG. 3 may be described in a manner consistent with the description provided in connection with FIG. 1 and FIG. 2, although in some examples such systems, devices, components, and items may involve alternative implementations with more, fewer, and/or different capabilities.

FIG. 3 illustrates data centers 32A-32X, which house servers that form respective ones of clusters 130. As one example, data center 32A houses servers 34A-34N that may be configured to provide the infrastructure for clusters 130A. The other data centers 34 may be substantially similar to data center 32A, but may house servers for other clusters 130. Also, one of data centers 32 may house servers for multiple clusters 130, or alternatively, one of clusters 130 may span multiple data centers 32.

In the example illustrated in FIG. 2, data centers 32A-32X (collectively, "data centers 32") are interconnected with one another and with customer networks associated with customers 46 via a service provider network 33. In general, each data center 32A provides an operating environment for applications and services for customers 46 coupled to the data center by service provider network 33. Data centers 32 may, for example, host infrastructure equipment, such as networking and storage systems, redundant power supplies, and environmental controls. Service provider network 33 may be coupled to one or more networks administered by other providers, and may thus form part of a large-scale public network infrastructure, e.g., the Internet.

In some examples, each of data centers 32 may represent one of many geographically distributed network data centers. As illustrated in the example of FIG. 3, each of data centers 32 may represent a facility that provides network services for customers 46. Customers 46 may be collective categories such as enterprises and governments or individuals. For example, a network data center may host a virtual computing environment (e.g., cloud) that provides web services for several enterprises and end users. Other exemplary services may include data storage, virtual private networks, traffic engineering, file service, data mining, scientific- or super-computing, and so on. In some examples, each of data centers 32 may be individual network servers, network peers, or otherwise.

In the illustrated example, each of data centers 32 includes a set of storage systems and application servers 34A-34N (herein, "servers 34") interconnected via high-speed switch fabric provided by one or more tiers of physical network switches and routers, including a set of interconnected top-of-rack (TOR) switches 40A-40N (collectively, "TOR switches 40") coupled to a distribution layer of chassis switches 42A-42Y (collectively, "chassis switches 42"). Although not shown, each of data centers 32 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example illustrated in FIG. 2, TOR switches 40 and chassis switches 42 provide servers 34 with redundant (multi-homed) connectivity to IP fabric 44 and service provider network 33. Chassis switches 42 aggregate traffic flows and provides high-speed connectivity between TOR switches 40. TOR switches 40 may be network devices that provide layer two (e.g., MAC) and/or layer 3 (e.g., IP) routing and/or switching functionality. TOR switches 40 and chassis switches 42 may each include one or more processors and a memory, and that are capable of executing one or more software processes. Chassis switches 42 are coupled to IP fabric 44, which performs layer 3 routing to route network traffic between data centers 32 and customers 46 by service provider network 33.

In the example illustrated in FIG. 3, data center 32A is configured to provide the infrastructure for cluster 130A. For example, servers 34A-34N may be configured to execute virtualized machines (VMs), containers or other virtualized executional elements to support the operation of cluster 130A. Moreover, in the example of FIG. 3, virtual network controller 136A is part of cluster 130A. Accordingly, servers 34A-34N may be configured to support the operation of virtual network controller 136A. Further, in some examples, controller 110 may be implemented as part of cluster 130A; accordingly, servers 34A to 34N may be configured to support the operation of controller 110.

As illustrated in FIG. 3, servers 34A through 34N execute VMs 50A through 50N. In the example illustrated, VMs 50A and 54N may together provide one or more virtualized machine on which virtual network controller 136A can execute and perform operations consistent with those described herein (e.g., provide a controller for endpoint configuration, provide route propagation, security, application deployment, and configuration within clusters 130A with, potentially, a single pane of glass interface). For instance, in some examples, each of endpoint services 137A-1 through 137A-N may execute on a virtual machine in server 34A. As labeled in FIG. 3, VM 50A executing on server 34A may provide an execution environment for execution of endpoint 137A-1, and VM 54N executing on server 34A may execute on endpoint 137A-N. Such virtualized machines on which endpoint 137A-1 and 137A-N may execute and perform endpoint operations consistent with described elsewhere herein. Such services may include authentication (e.g., OpenStack's Keystone service), image management (e.g., OpenStack's Glance service), storage (e.g., OpenStack's Swift service), analytics, telemetry, or other services.

Similarly, servers 34B through 34N execute VMs 50B through 50N and VMs 54B through 54N. In the example illustrated, such VMs may together provide an execution environment and computing infrastructure for customer or tenant applications deployed within data center 32A. Although a specific allocation and arrangement of execution environments for components of controller 136 and endpoints 137 is illustrated in FIG. 3, in other examples, a different arrangement may be used, and may span multiple data centers.

In general, VMs 50A through 50N and VMs 54A through 54N execute on processing circuitry of respective servers 34A, 34B, and 34N. VMs 50A, 50B, 50N, 54A, 54B, and 54N are illustrated merely to assist with understanding and should not be considered as limiting. For example, controller 110 may be configured to spin up and spin down virtual machines across or within servers 34 as needed to support the operations of 130A, virtual network controller 136A, any of endpoints 137A, and/or controller 110. However, the example techniques are not so limited, and in some examples, controller 136A and/or controller 110 may be configured to determine resources within data center 32A that are to be utilized (e.g., how many VMs are spun up or spun down) for cluster 130A. Moreover, in some examples, controller 110 and/or virtual network controller 136A may be configured to determine resources within the other data centers 32 that are to be utilized (e.g., how many VMs are spun up or spun down) for the other clusters 130.

Virtual network controller 136A provide a logically and in some cases physically centralized controller for facilitating operation of one or more virtual networks within each of data centers 32, such as data center 32A. In some examples, controller 110 and/or virtual network controller 136A may operate in response to configuration input received from network administrator 38. Moreover, as illustrated, in this example, administrator 38 may be tasked with providing configuration information so that controller 110 and/or virtual network controller 136A can perform the example operations described in this disclosure. Administrator 38 may represent an operator, developer, or application deployment specialist that uses a common interface to create and deploy virtual computing environment topologies to controller 110 for provisioning within the computing infrastructure.

In some examples, the traffic between any two network devices, such as between network devices within IP fabric 44 (not shown), between servers 34, and customers 46, or between servers 34, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection. The flow within data center 32A is one example of a flow. Another example of a flow is the flow of data between clusters 130.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multi-protocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

In the example of FIG. 3, and in accordance with one or more aspects of the present disclosure, controller 110 may configure one or more aspects of one or more clusters 130. For instance, with reference to FIG. 3, controller 110 detects input from a computing device operated by administrator 38 and determines that administrator 38 is an authenticated user. Controller 110 detects further input and determines that the input corresponds to a request to configure one or more aspects of virtual network controllers 136A within cluster 130A. Specifically, controller 110 determines that the input includes information identifying cluster 130A and endpoint 137A-1 within cluster 130A. Controller 110 uses the input to communicate with VMs 54A through 54N, which implement endpoint 137A-1, to perform the configurations specified by the input. Such configurations may involve changing the configuration of endpoint 137A-1, for example. In other examples, such configurations may include instantiating and/or creating an additional endpoint (e.g., endpoint 137A-2), which may be implemented through an additional set of virtual machines hosted on servers 34.

FIG. 4 is a conceptual illustrations of an example database table that may be used to store information about endpoint configurations, in accordance with one or more aspects of the present disclosure. The table illustrated in FIG. 4 illustrates a number of sample columns that may be implemented in a SQL database performing the operations described herein as being performed by data store 128 of FIG. 2. Also illustrated are sample data types associated with each listed column, and whether each corresponding column may contain null values.

FIG. 5A and FIG. 5B are conceptual illustrations of a table of object identifiers, endpoint prefixes, object types, and corresponding URLs, in accordance with one or more aspect of the present disclosure. FIG. 5A shows a universally unique identifier ("UUID") and a prefix are used as a key to identify a private URL and port value for an endpoint specified by a configuration request. Information shown in FIG. 5A may form the basis for a key-value store (e.g., cache 129) as described in connection with FIG. 2. FIG. 5B shows a table of prefixes for a cluster object, along with the UUID for that cluster object. In the specific example of FIG. 5B, the cluster object has a "contrail-cluster" type, and the listed prefixes are a set of prefixes associated with the contrail cluster identified by the UUID listed for that contrail cluster (i.e., in the center column).

FIG. 6A is an example REST API call that may be received by an example computing system that serves as a configuration proxy, in accordance with one or more aspects of the present disclosure. For instance, with reference to FIG. 2, the REST API call of FIG. 6A may correspond to request 140, and may represent a project-scoped token request sent by a computing device operated by administrator 38 to controller 110. Controller 110 receives the REST API call and uses the "x-cluster-id" in the HEADER along with prefix "keystone" to look up the keystone service endpoint. Controller 110 then routes the request to the specific keystone service.

FIG. 6B is an example REST API call that may be initiated by an example computing system to an endpoint for the purpose of configuring that endpoint, in accordance with one or more aspects of the present disclosure. FIG. 6B illustrates a proxy request, pe. For instance, again referring to FIG. 2, FIG. 6A shows a proxy request, to a "nodejs" endpoint. To perform the request, controller 110 parses the cluster-id and prefix from the URL with in the REST API call. Controller 110 uses the cluster-id (ac28718E-63FIG. 5-4Dae-907F-ba459C883D26) and prefix (nodejs) to look up the endpoint private URL of the endpoint to be configured. Once controller 110 determines that private URL, controller 110 routes the request to the appropriate nodejs service.

FIG. 7A through FIG. 7E are conceptual diagrams illustrating example user interfaces presented by a user interface device, in accordance with one or more aspects of the present disclosure. Although the user interfaces illustrated in FIG. 7A through FIG. 7E are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 7A through FIG. 7E may be described herein within the context of network 100 and/or controller 110 of FIG. 2.

In some examples, and with reference to FIG. 2, one or more of the user interfaces illustrated in FIG. 7A through FIG. 7E may be presented by a computing device operated by administrator 38. For instance, user interface module 126 of controller 110 may, in response to input received from a computing device operated by administrator 38, generate data sufficient for the computing device operated by administrator 38 to generate and display a user interface. User interface module 126 may output the data (i.e., a "user interface") over a network for display at the computing device operated by administrator 38. That computing device may detect interactions with the user interface (e.g., mouse movements, keystrokes, touch input) and output information about the input over the network to controller 110. Controller 110 may update or generate new data sufficient to generate further user interfaces. Controller 110 and the computing device operated by administrator 38 may continue to communicate, with the result being that multiple user interfaces, of the type illustrated in FIG. 7A through FIG. 7E, are presented for display, viewing, and interaction by administrator 38.

Figure 7A:
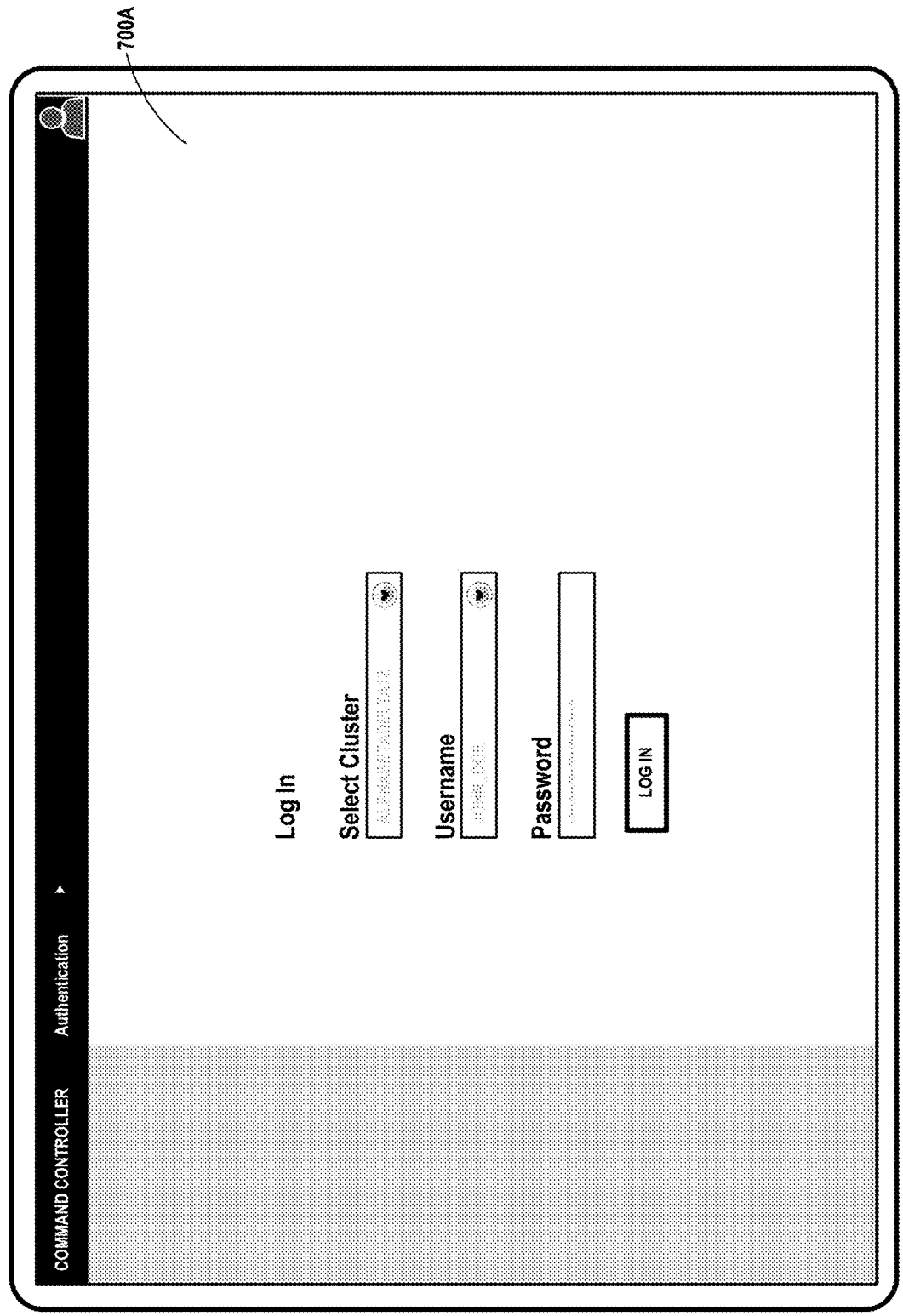
FIG. 7A through FIG. 7E are conceptual diagrams illustrating example user interfaces presented by a user interface device, in accordance with one or more aspects of the present disclosure.

FIG. 7A illustrates user interface 700A, implemented as a web page that may enable administrator 38 to authenticate with controller 110. In some examples, user interface 700 may present a drop-down control enabling a user (e.g., administrator 38) to select credentials associated with a cluster, and (after authenticating) use those credentials to view information about a cluster (e.g., view clusters within network 100). Alternatively, or in addition, a user may select credentials associated with controller 110 (rather than credentials associated with any particular cluster), and use those credentials to view information about multiple endpoints across multiple clusters.

Figure 7B:
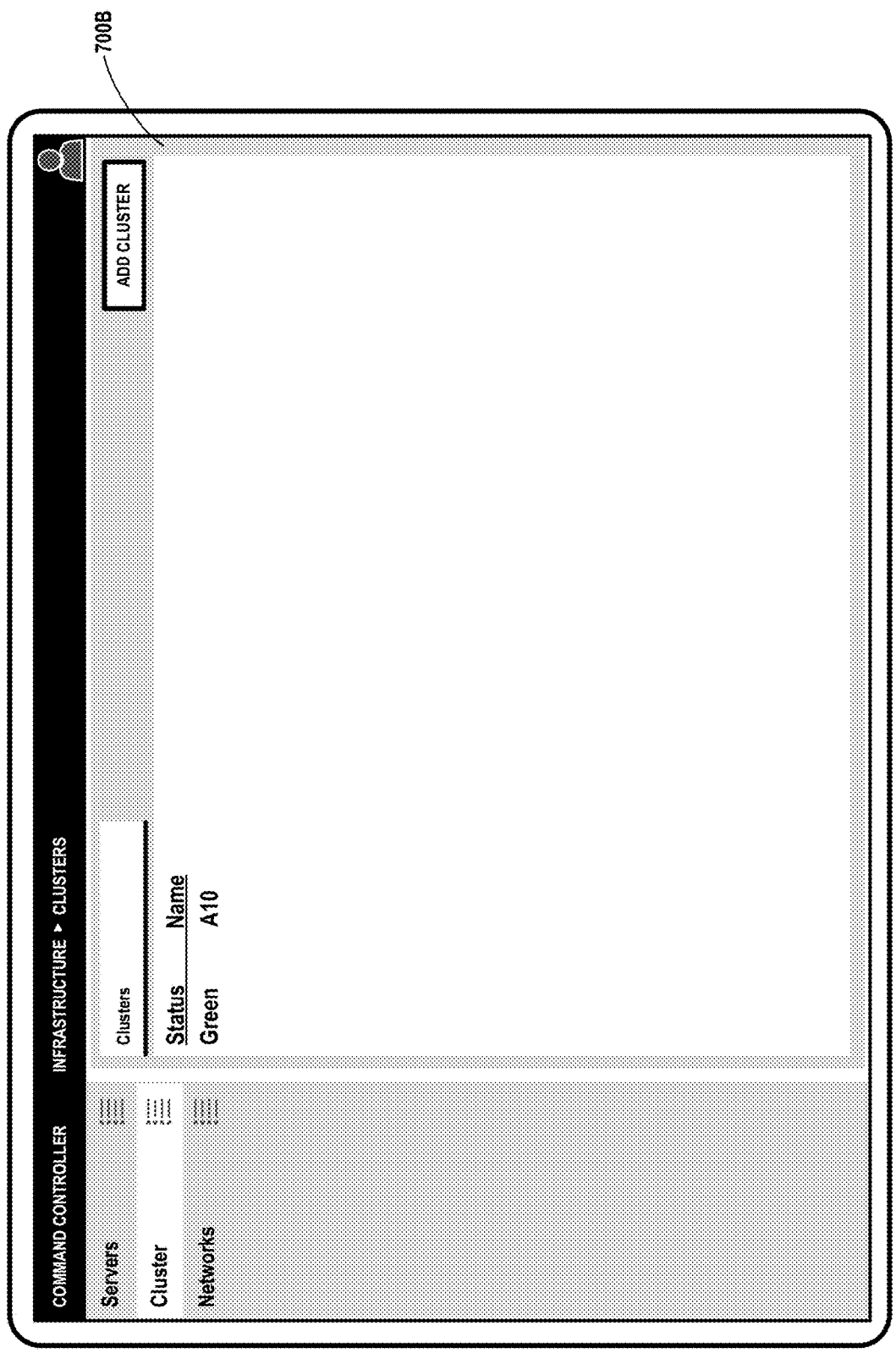

FIG. 7B illustrates a user interface (i.e., web page) presenting a multiple-cluster view. In the example of FIG. 7B, user interface 700B presents a list of clusters within network 100. In the particular example shown in FIG. 7B, only a single cluster, "AIO," is listed, but in other examples many more clusters may be listed. Status or other information about each cluster may also be displayed within user interface 700B.

Figure 7C:
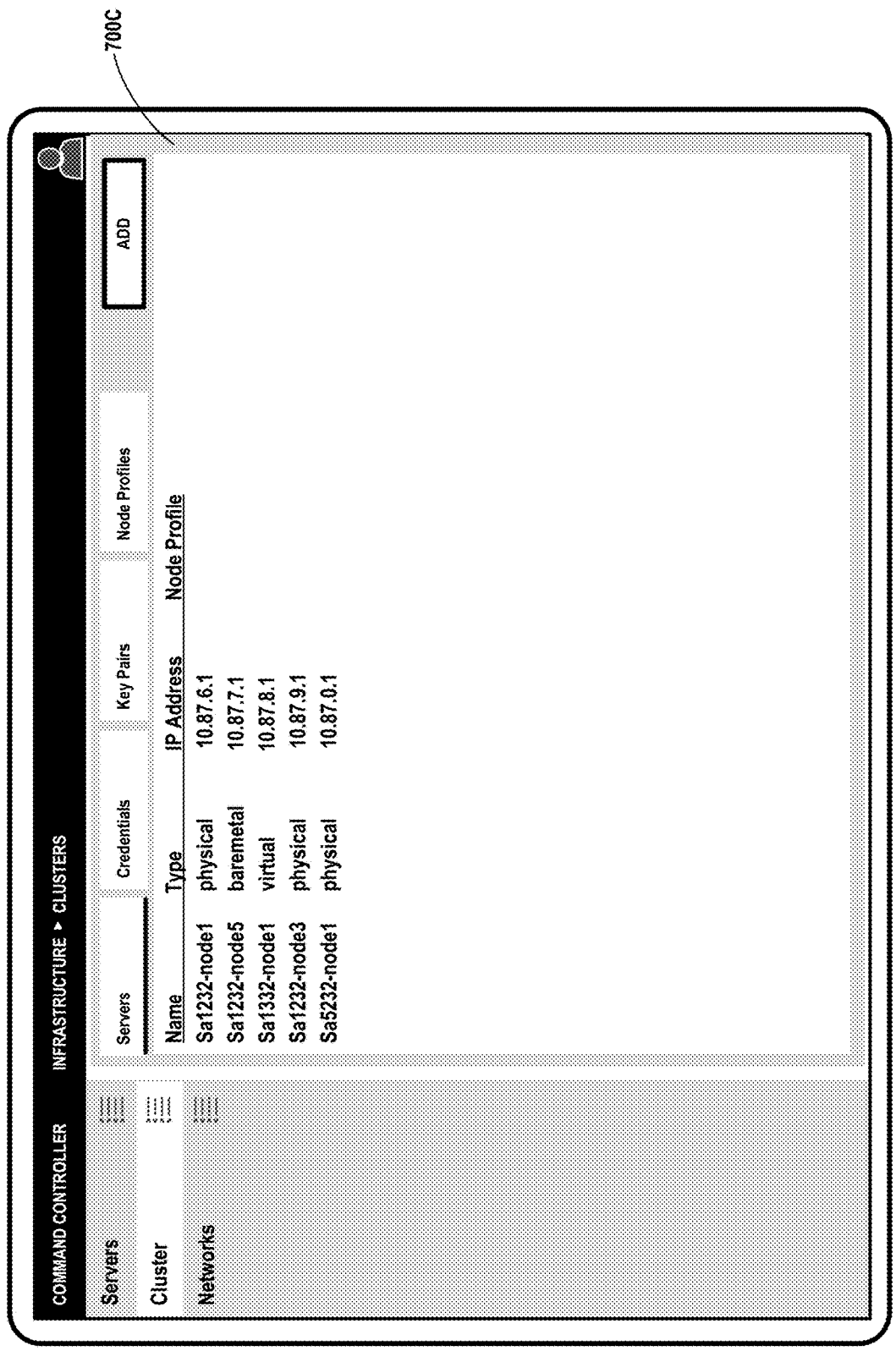

FIG. 7C illustrates a user interface that describes a sequence of steps that may be taken to create or instantiate a new cluster. Within the view shown in FIG. 7C, user interface 700C lists a number of servers associated with a selected cluster. A user may interact with user interface 700C to show other information about the selected cluster, including "Credentials," "Key pairs," and "Node profiles."

Figure 7D:
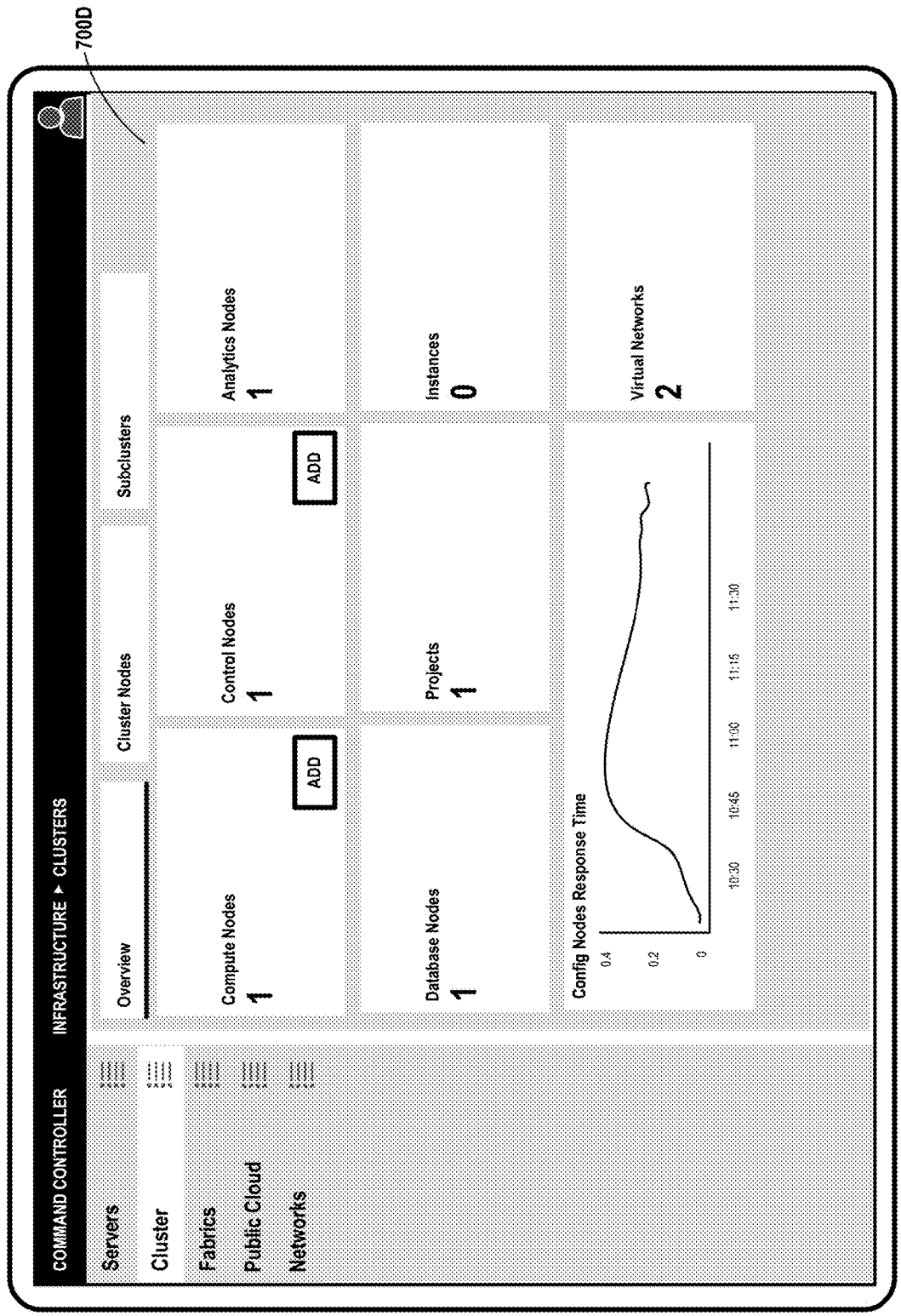

FIG. 7D illustrates a user interface that presents further information about a specific selected cluster. In FIG. 7D, user interface 700D presents including information about the number of different types of nodes (or endpoints) that are included in the cluster (the quantity of compute nodes, control nodes, analytics nodes, config nodes, database nodes). Further information, including analytics information is presented within user interface 700D. In some examples, the information shown in user interface 700D is available to a user that has authenticated using credentials associated with a specific cluster 130 (as opposed to credentials associated with controller 110), but information about multiple clusters might not be available to such a user, without further authentication.

Figure 7E:
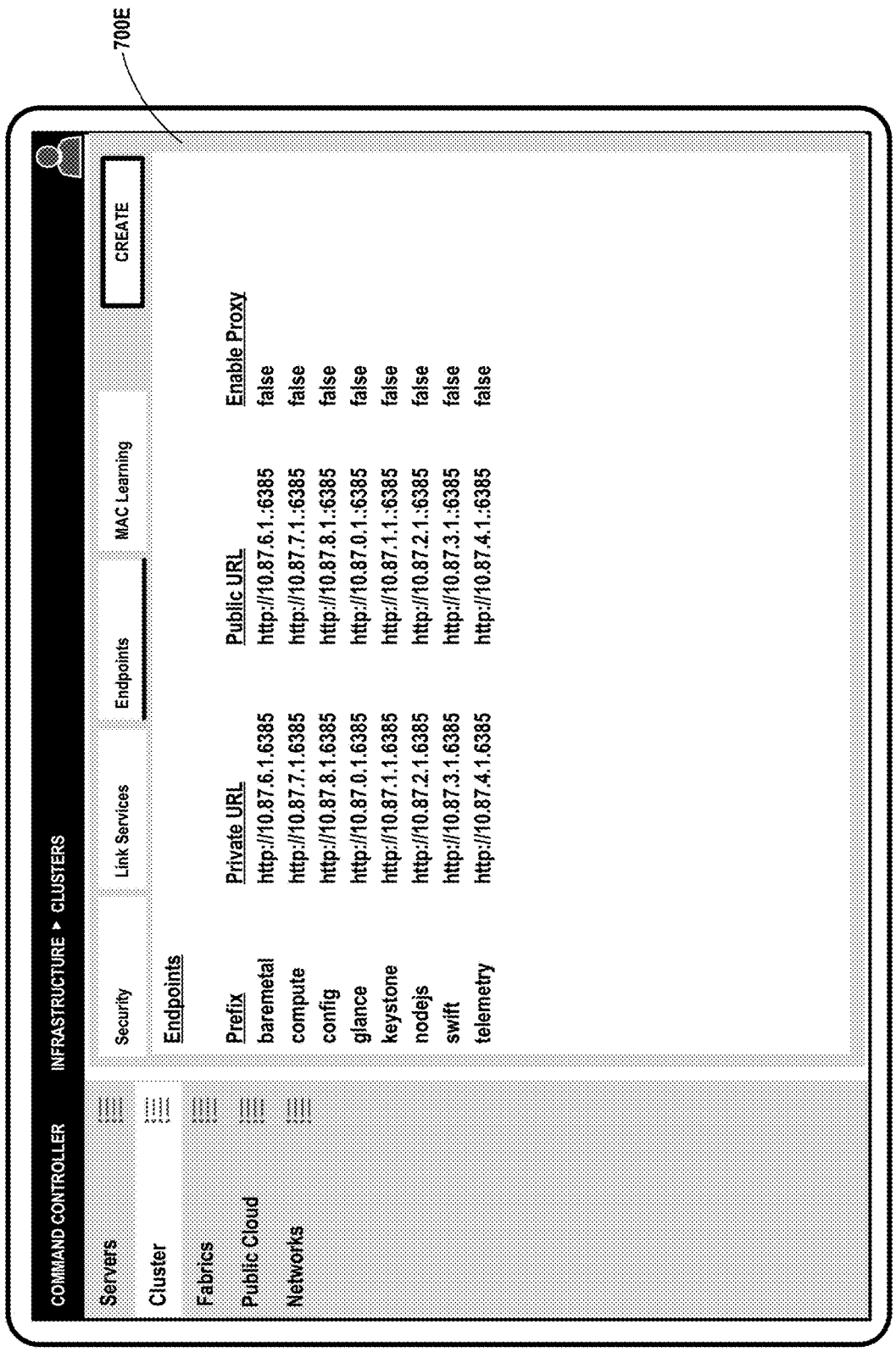

FIG. 7E illustrates a user interface that lists some or all of the endpoints included within a given cluster. In FIG. 7E, user interface 700E presents a list of endpoint prefixes for a selected cluster, along with the private and public URLs associated with each endpoint. Other information may also be provided, including, information about capabilities for each of the endpoints. In the example shown in FIG. 7E, an "Enable Proxy" column is shown in the "Endpoints" tab of user interface 700E.

Figure 8:
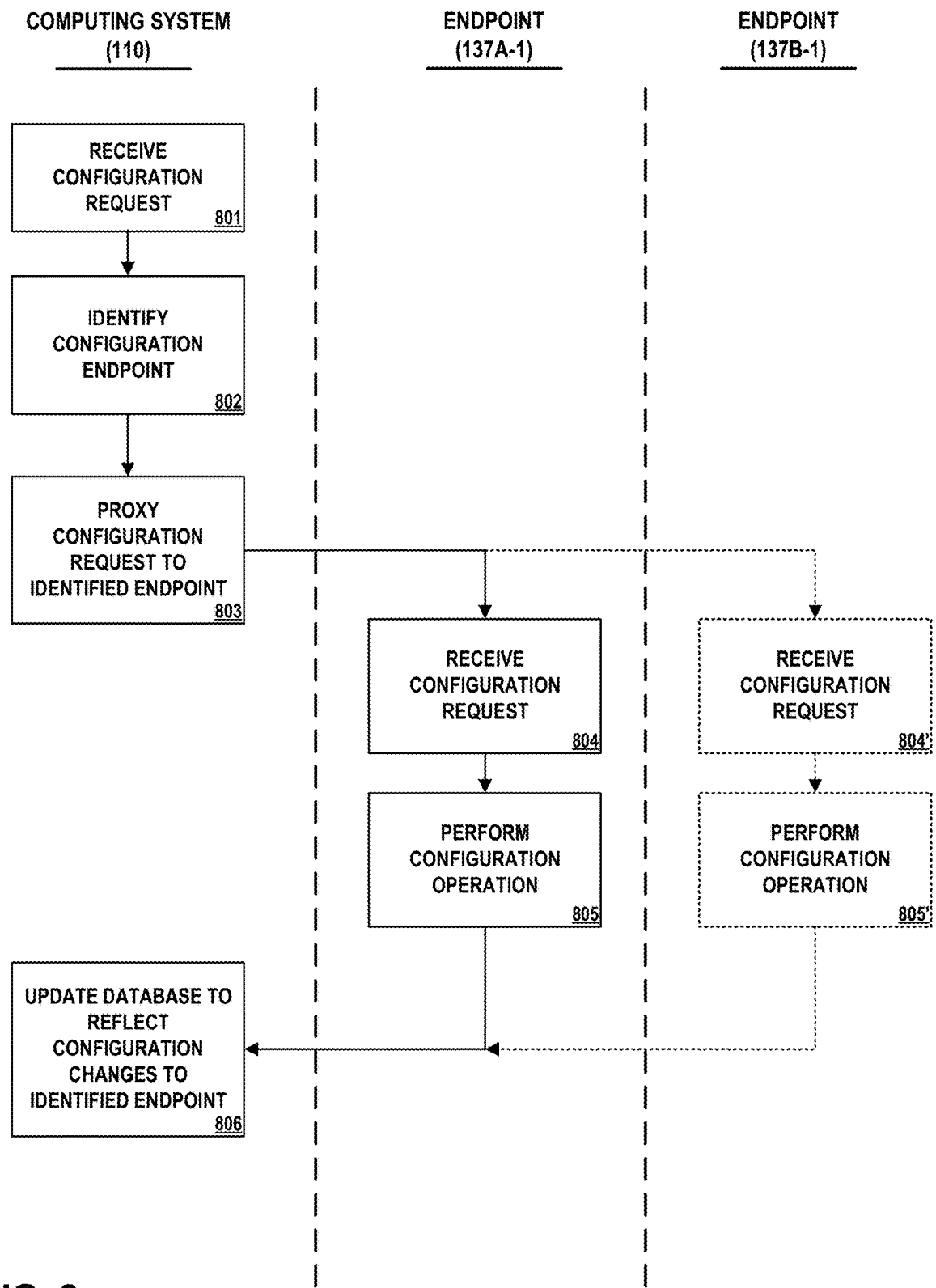
FIG. 8 is a flow diagram illustrating an example process for performing endpoint configuration or management tasks in accordance with one or more aspects of the present disclosure.

FIG. 8 is a flow diagram illustrating an example process for performing endpoint configuration or management tasks in accordance with one or more aspects of the present disclosure. The process of FIG. 8 is illustrated from three different perspectives: operations performed by an example proxy controller 110 (left-hand column to the left of dashed line), operations performed by a first example endpoint (middle column between dashed lines), and operations performed by an example a second example endpoint (right-hand column to the right of dashed line).

In the example of FIG. 8, the illustrated process may be performed by network 100 in the context illustrated in FIG. 2. In particular, the proxy computing system (left column of FIG. 8) may correspond to controller 110 of FIG. 2. The first example endpoint (middle column of FIG. 8) may correspond to endpoint 137A-1 within cluster 130A of FIG. 2. Similarly, the second example endpoint (right column) may correspond to an endpoint within cluster 130B, which although not specifically shown within FIG. 2, may have a corresponding reference numeral of endpoint 137B-1. In other examples, different operations may be performed, or operations described in FIG. 8 as being performed by a particular component, module, system, and/or device may be performed by one or more other components, modules, systems, and/or devices. Further, in other examples, operations described in connection with FIG. 8 may be performed in a difference sequence, merged, omitted, or may encompass additional operations not specifically illustrated or described even where such operations are shown performed by more than one component, module, system, and/or device.

In the process illustrated in FIG. 8, and in accordance with one or more aspects of the present disclosure, controller 110 may receive a configuration request (801). For instance, in an example that can be described with reference to FIG. 2, communication unit 115 of controller 110 detects input and outputs an indication of input to API module 124. API module 124 determines that the input corresponds to request 140 from a client device operated by administrator 38.

Controller 110 may identify a configuration endpoint specified by the request (802). For instance, continuing with the example being described with reference to FIG. 2, API module 124 parses request 140 to determine prefix 141 and identifier 142. API module 124 determines that request 140 includes information about a configuration or management operation to be performed on a specific cluster. API module 124 further determines that identifier 142, included within request 140, identifies cluster 130A. API module 124 also determines that prefix 141, also included within request 140, identifies endpoint 137A-1 within cluster 130A.

Controller 110 may proxy the request to the identified endpoint (803). For instance, again with reference to FIG. 2, API module 124 accesses data store 128 and/or cache 129 to determine a URL for endpoint 137A-1. Authentication module 122 of controller 110 causes communication unit 115 to output a signal over a network destined for endpoint 137A-1. Authentication module 122 causes controller 110 to further communicate with endpoint 137A-1 to authenticate administrator 38. Authentication module 122 outputs information to API module 124, indicating that administrator 38 has been authenticated to manage endpoint 137A-1. API module 124 causes communication unit 115 to output to a signal specifying a configuration operation to be performed by endpoint

137A-1. In some examples, the signal corresponds to a REST API call generated by API module 124 of controller 110.

Endpoint 137A-1 may receive the configuration request (804). For instance, in FIG. 2, endpoint 137A-1 detects input that it determines corresponds to the signal output by API module 124 of controller 110. In some examples, the signal received by endpoint 137A-1 may correspond to the REST API call generated by API module 124.

Endpoint 137A-1 may perform a configuration operation (805). For instance, referring again to FIG. 2, endpoint 137A-1 performs one or more configuration or management operations specified by the REST API call. Endpoint 137A-1 may output information about the configurations back to controller 110.

Controller 110 may update a database to reflect configuration changes (806). For instance, referring again to FIG. 2, controller 110 may receive information from endpoint 137A-1 about the configurations performed at endpoint 137A-1. API module 124 of controller 110 may update data store 128 to include information about the configurations, and API module 124 may also update cache 129 to include at least some of the information stored in data store 128. Although controller 110 may receive configuration information directly from endpoint 137A-1, controller 110 may acquire such information in another way. For example, controller 110 may sense or detect configuration or other operations being made to one or more endpoints within any of clusters 130. Upon sensing or detecting such operations, controller 110 may update data store 128 to reflect information about such operations. Accordingly, controller 110 may dynamically update data store 128 by using information that it has used to modify one or more endpoints 137, by receiving configuration information from one or more endpoints 137, by otherwise detecting or sensing information about configuration changes, or in another way.

As described herein, controller 110 is not limited to performing configuration operations for only one cluster. Instead, controller 110 may in some examples serve as a central proxy for routing configuration requests to multiple clusters. In particular, controller 110 may route configuration requests to multiple endpoints within multiple clusters. Accordingly, blocks 804' and 805' (drawn with dotted lines) are intended to illustrate that some configuration requests may be routed to endpoints in clusters other than cluster 130A. In particular, endpoint 137B-1 within cluster 130B may receive the configuration request (805'). Endpoint 137B-1 may perform the configuration operation specified in the configuration request (806'). In such an example, controller 110 may update data store 128 to reflect changes to the configuration of endpoint 137B-1.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing systems 110, virtual network controllers 136, endpoints 137, networks 44, servers 34, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   authenticating, by a computing system, a user to manage a plurality of configurable endpoints across a plurality of clusters;
   receiving, by the computing system, a plurality of requests, each specifying a configuration operation within a different cluster within the plurality of clusters;
   identifying, for each request of the requests, a configuration cluster from among the plurality of clusters;
   identifying, for each request of the requests, a configuration endpoint of the plurality of configuration endpoints within the identified configuration cluster for the request;
   communicating with each of the identified endpoints, by the computing system and for each request, to perform the corresponding configuration operation and thereby enable the user to perform configuration operations across each of the plurality of clusters;
   updating a data store, by the computing system and for each configuration operation, to include information about the configuration operations performed across each of the plurality of clusters;
   receiving, by the computing system, an additional request; and
   responsive to receiving the additional request, instantiating, by the computing system, a new cluster to add to the plurality of clusters.

2. The method of claim 1, wherein instantiating the new cluster includes:
   instantiating a plurality of new endpoints within the new cluster.

3. The method of claim 2, further comprising:
   receiving, by the computing system, a new request specifying a new configuration operation;
   identifying, by the computing system, the new configuration cluster as being associated with the new request;
   identifying, by the computing system, an endpoint from among the plurality of new endpoints within the new cluster;
   communicating, by the computing system, with the new cluster to perform the new configuration operation at the identified endpoint from among the plurality of new endpoints; and
   updating the data store, by the computing system, to include information about the new configuration operation.

4. The method of claim 1, wherein authenticating the user includes:

outputting a user interface to a computing device; and
authenticating the computing device based on input received from the computing device after outputting the user interface.

5. The method of claim 4, wherein authenticating the computing device includes:
authenticating the computing device to manage at least one of the plurality configurable endpoints within the plurality of clusters.

6. The method of claim 1, wherein the data store includes a cache, and wherein identifying the configuration endpoint includes:
parsing a prefix from the request; and
using the prefix to access information within the cache.

7. A computing system comprising processing circuitry and a storage device, wherein the processing circuitry has access to the storage device and is configured to:
communicate with a plurality of computing clusters, including a first cluster comprising a first SDN controller and a first configurable endpoint, and a second cluster comprising a second SDN controller and a second configurable endpoint;
receive a first request specifying a first configuration operation;
determine that the first configuration operation is to be performed on the first configurable endpoint within the first cluster;
communicate with the first configurable endpoint within the first cluster to perform the first configuration operation, wherein communicating with the first endpoint includes accessing a first set of authentication credentials for the first configuration endpoint;
receive a second request specifying a second configuration operation;
determine that the second configuration operation is to be performed on the second configurable endpoint within the second cluster;
communicate with the second configurable endpoint within the second cluster to perform the second configuration operation, wherein communicating with the second endpoint includes accessing a second set of authentication credentials for the second configuration endpoint thereby enabling a user to perform configuration operations within both the first cluster and the second cluster;
update a data store to include information about the first configuration operation and the second configuration operation;
receive a third request specifying a third configuration operation; and
responsive to receiving the third request, instantiating, by the computing system, a third cluster to add to the plurality of clusters.

8. The computing system of claim 7, wherein to instantiate the third cluster, the processing circuitry is further configured to:
instantiate a plurality of new endpoints within the third cluster, including a third configurable endpoint within the third cluster.

9. The computing system of claim 8, wherein the processing circuitry is further configured to:
receive a fourth request specifying a fourth configuration operation;
determine that the fourth configuration operation is to be performed on the third configurable endpoint within the third cluster;
communicate with the third cluster to perform the fourth configuration operation on the third configurable endpoint within the third cluster; and
update the data store to include information about the fourth configuration operation.

10. The computing system of claim 9, wherein to communicate with the third cluster, the processing circuitry is further configured to:
access a third set of authentication credentials for the third cluster.

11. The computing system of claim 7, wherein the first cluster includes a plurality of configurable endpoints, including the first configurable endpoint and a third configurable endpoint, and wherein the processing circuitry is further configured to:
receive a third request specifying a third configuration operation;
determine that the third configuration operation is associated with the third configurable endpoint within the first cluster;
communicate with the third configurable endpoint within the first cluster to perform the third configuration operation, wherein communicating with the third configurable endpoint includes accessing the first set of authentication credentials; and
update the data store to include information about the third configuration operation.

12. The computing system of claim 7, wherein accessing the first set of authentication credentials includes:
outputting a user interface to a computing device; and
authenticating the computing device based on input received from the computing device after outputting the user interface.

13. A non-transitory computer-readable medium comprising instructions that, when executed, cause processing circuitry of a computing system to:
communicate with a plurality of computing clusters, including a first cluster comprising a first SDN controller and a first configurable endpoint, and a second cluster comprising a second SDN controller and a second configurable endpoint;
receive a first request specifying a first configuration operation;
determine that the first configuration operation is to be performed on the first configurable endpoint within the first cluster;
communicate with the first configurable endpoint within the first cluster to perform the first configuration operation, wherein communicating with the first endpoint includes accessing a first set of authentication credentials for the first configuration endpoint;
receive a second request specifying a second configuration operation;
determine that the second configuration operation is to be performed on the second configurable endpoint within the second cluster;
communicate with the second configurable endpoint within the second cluster to perform the second configuration operation, wherein communicating with the second endpoint includes accessing a second set of authentication credentials for the second configuration endpoint thereby enabling a user to perform configuration operations within both the first cluster and the second cluster;
update a data store to include information about the first configuration operation and the second configuration operation;

receive a third request specifying a third configuration operation; and responsive to receiving the third request, instantiating, by the computing system, a third cluster to add to the plurality of clusters.

14. The computer-readable medium of claim 13, wherein the instructions that instantiate the third cluster further include instructions that configure the processing circuitry to:

instantiate a plurality of new endpoints within the third cluster, including a third configurable endpoint within the third cluster.

15. The computer-readable medium of claim 14, further comprising instructions that configure the processing circuitry to:

receive a fourth request specifying a fourth configuration operation;

determine that the fourth configuration operation is to be performed on the third configurable endpoint within the third cluster;

communicate with the third cluster to perform the fourth configuration operation on the third configurable endpoint within the third cluster; and update the data store to include information about the fourth configuration operation.

16. The computer-readable medium of claim 15, wherein the instructions that communicate with the third cluster further include instructions that configure the processing circuitry to:

access a third set of authentication credentials for the third cluster.

17. The computer-readable medium of claim 13, wherein the first cluster includes a plurality of configurable endpoints, including the first configurable endpoint and a third configurable endpoint, and wherein the computer-readable medium further comprises instructions that configure the processing circuitry to:

receive a third request specifying a third configuration operation;

determine that the third configuration operation is associated with the third configurable endpoint within the first cluster;

communicate with the third configurable endpoint within the first cluster to perform the third configuration operation, wherein communicating with the third configurable endpoint includes accessing the first set of authentication credentials;

update the data store to include information about the third configuration operation.

* * * * *